United States Patent
Jakobsson et al.

(10) Patent No.: US 11,193,469 B2
(45) Date of Patent: Dec. 7, 2021

(54) METHOD FOR OPERATING A WIND TURBINE, WIND TURBINE, AND CONTROL MEANS FOR A WIND TURBINE

(71) Applicant: 2-B ENERGY B.V., Hengelo (NL)

(72) Inventors: Mikael Jakobsson, Vienna (AT); Herbert Peels, Ootmarsum (NL)

(73) Assignee: 2-B ENERGY B.V.

(*) Notice: Subject to any disclaimer, the term of this patent is extended or adjusted under 35 U.S.C. 154(b) by 0 days.

(21) Appl. No.: 16/358,562

(22) Filed: Mar. 19, 2019

(65) Prior Publication Data
US 2020/0300220 A1    Sep. 24, 2020

(51) Int. Cl.
*F03D 7/04* (2006.01)
*F03D 7/02* (2006.01)

(52) U.S. Cl.
CPC ......... *F03D 7/0224* (2013.01); *F03D 7/0204* (2013.01); *F05B 2270/321* (2013.01); *F05B 2270/326* (2013.01); *F05B 2270/328* (2013.01)

(58) Field of Classification Search
CPC .............. F03D 7/0204; F03D 7/0224; F05B 2270/329; F05B 2260/964
See application file for complete search history.

(56) References Cited

U.S. PATENT DOCUMENTS

| | | | |
|---|---|---|---|
| 7,365,447 B2* | 4/2008 | Yoshida | F15D 1/12 290/55 |
| 8,162,608 B2* | 4/2012 | Birkemose | F03D 7/024 416/31 |
| 8,249,754 B2* | 8/2012 | Hayashi | F03D 7/042 700/287 |
| 8,353,667 B2* | 1/2013 | Hoffmann | F03D 7/043 416/37 |
| 8,529,206 B2* | 9/2013 | Numajiri | F03D 7/024 416/1 |
| 9,447,773 B2* | 9/2016 | Egedal | G01B 15/06 |
| 10,036,368 B2* | 7/2018 | Jakobsson | F03D 7/0204 |
| 2018/0187646 A1* | 7/2018 | Arlaban Gabeiras | F03D 7/024 |

* cited by examiner

*Primary Examiner* — Ninh H. Nguyen
(74) *Attorney, Agent, or Firm* — Lewis Brisbois Bisgaard & Smith, LLP

(57) ABSTRACT

In the case of wind turbines 10, deviations from the optimum operating state result in output losses. This applies, in particular, to angular deviations 62 in the alignment of the nacelle 14, and therefore of the rotor axis 28, relative to the wind direction 60. The invention relates to a wind turbine 10, and to a method for operating such a wind turbine, which wind turbine and method enable the nacelle 14 to be corrected, in respect of the wind direction, both on the basis of wind power and by motor.

7 Claims, 4 Drawing Sheets

Figure 1:
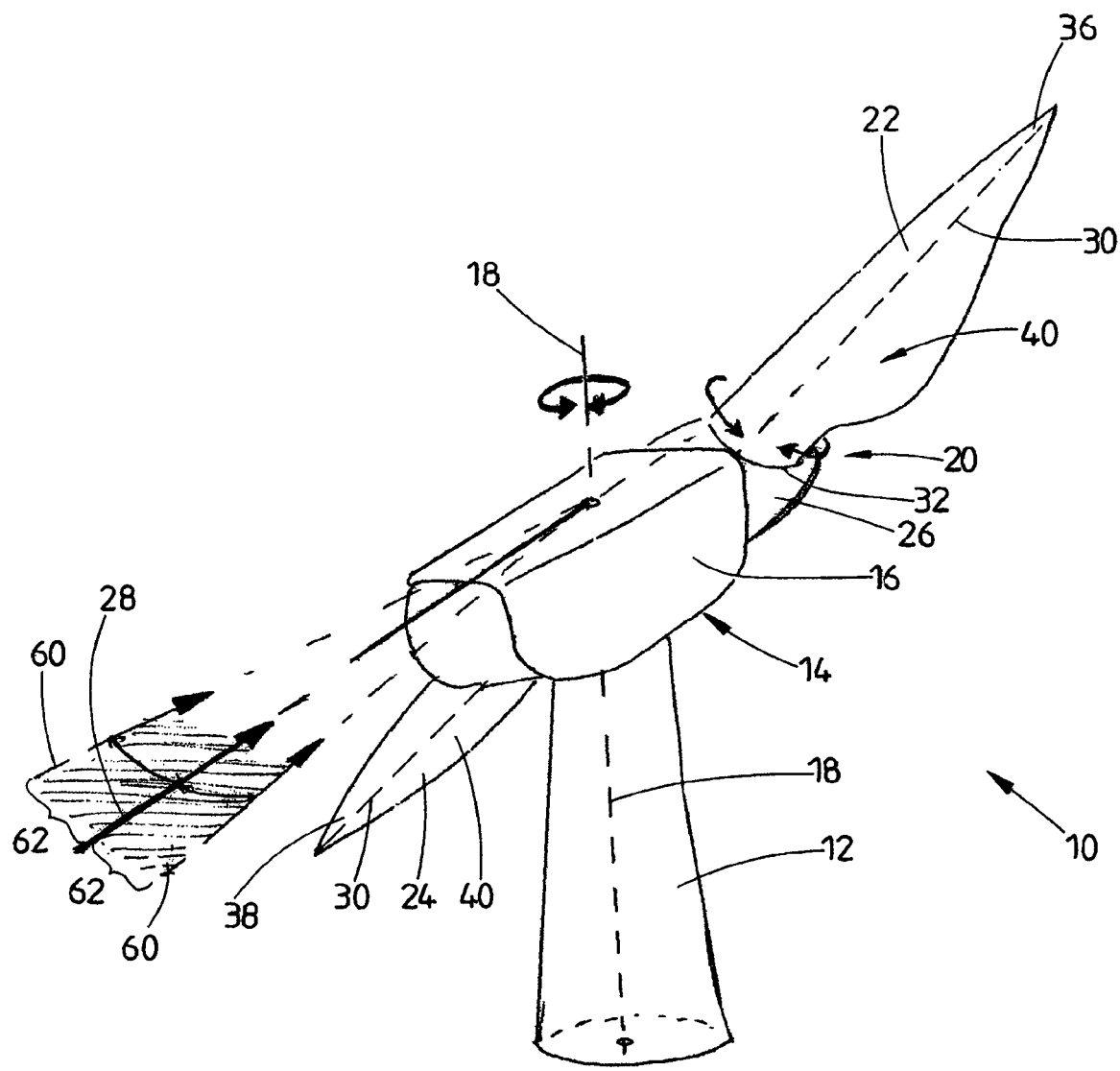

METHOD FOR OPERATING A WIND TURBINE, WIND TURBINE, AND CONTROL MEANS FOR A WIND TURBINE

The invention relates to a method for operating a wind turbine according to the preamble of claim 1. Furthermore, the invention relates to a wind turbine. Finally the invention relates to a control means for a wind turbine.

Modern wind turbines feature high outputs and, associated with this, corresponding structural sizes. In recent years, the size of the turbines has grown, from a rotor diameter of a few meters and an output power of some tens to hundreds of kilowatts, to what is now a rotor diameter of well over a hundred meters and outputs of several megawatts per turbine. Moreover, wind turbines are now being installed, not only on land (onshore), but also increasingly on the high seas (offshore). Besides the technical development in the field of transmission and generator technology, it is sought, in particular, to solve problems of material loading and optimum control of wind turbines. The wind turbines that constitute the subject matter here have a rotor, which is mounted on a rotatably mounted nacelle and which has a least one, preferably two or four rotor blades.

In the case of the current large rotor diameters, significantly differing wind speeds and, to some extent, wind directions, have to be taken into account, not only for different blades of a rotor, but also even in the case of a single blade. These differences in the loading occur both instantaneously and more or less periodically in the course of the revolution of the rotor. Besides differing wind speeds and wind directions, it is also necessary to take account of air vortices, shadowing and locally high blade loads with corresponding weighing forces. Many of these problems are already minimized by so-called downwind turbines, i.e. a rotor disposed on the side of the nacelle that faces away from the wind. A two-bladed or four-bladed geometry means that the structure is considerably less complex than that of the typical three-bladed turbines.

Output losses resulting from non-optimum operating states are to be avoided as far as possible. For example, in the case of angular deviations between the rotor axis and the wind direction, i.e. if there are changes in the wind direction or if the nacelle rotates out of position, correction of the rotor is usually effected by means of a motor, since otherwise the output of the turbine drops significantly. Normally, in the prior art, a so-called yaw motor is mounted on the nacelle, the yaw motor being able to rotate the entire nacelle about a vertical axis for the purpose of correcting it to the wind direction.

A disadvantage of this is that energy is required for this adjustment. Moreover, the forces that occur are so great that a high correction speed and a low energy expenditure are normally mutually exclusive. Generally, it is to be made possible for a wind turbine to operate continuously in its optimum operating state with fewest possible correcting variables.

The object on which the invention is based consists in specifying a wind turbine and a corresponding method for operating the same, in order to overcome the described disadvantages of the prior art.

A method having the features of claim 1 achieves the object on which the invention is based. Firstly, an angular deviation of the nacelle position from a setpoint position is determined. The method is distinguished in that the angle of attack of each of the rotor blades is adjusted individually and/or continuously. This adjustment is effected in such a manner that the nacelle is made to rotate for the purpose of correcting the rotor axis into the setpoint position. In this case, use is made of the fact that, by changing the angle of attack, forces of differing magnitudes can act upon different blades. For this purpose, the angle of attack of two rotor blades is set differently on opposite sides of the perpendicular, such that a resultant yaw moment thus ensues because of the differing forces. The overall result of this is that a torque acts upon the nacelle, such that, when the blades are set correctly, the nacelle rotates about the vertical axis. Thus, preferably, a correction of the nacelle in the wind direction is thereby achieved. Moreover, used for this purpose is a system for controlling the angle of attack, which system is present for the purpose of adapting to differing wind speeds. Accordingly, the angle of attack, i.e. the angle of rotation of the rotor blade relative to the rotation plane of the rotor, is adapted dynamically during the revolution of the rotor. Owing to the large rotor diameter and correspondingly low revolution speeds, with periods of at least one second, typically a plurality of seconds per revolution, it is possible for the angle of attack to be adjusted dynamically and individually, i.e. separately, for each rotor blade.

Preferably, the rotation of the nacelle is effected by wind forces and/or motor forces. Particularly preferably, in the case of a predetermined angular deviation of the nacelle position from the setpoint position being exceeded, a limit value, the nacelle is first rotated by motor, for the purpose of correction. The angular deviation relates to both directions of rotation of the nacelle. The limit value may be defined in advance, and may be, in particular, technically based. For example, a nacelle angle of 90° relative to the wind direction has the result that the rotation plane of the rotor is parallel to the wind direction, and thus the rotor can virtually no longer be driven. Rotation by motor is preferably effected at least until the angular deviation becomes less than the predetermined angular deviation. In particular, the correction by motor may be effected at least to such an extent that a further correction by wind force can take effect. Further, preferably, the rotation by motor is effected until the setpoint position has been attained, at least substantially. It is thereby ensured, in the case of excessive deviations that cannot be compensated by a rotation by wind force only, or that can be so compensated only with difficulty, that a correction by motor forces is ensured. Below the predetermined angular deviation, both motor forces and wind forces can then be used for correction.

Particularly preferably, the rotation of the nacelle is damped, at least temporarily. In particular, the damping, in particular the strength of the damping, can be set. Preferably, the damping is effected by means of at least one damping element. The damping element has, in particular, a settable and/or controllable damping effect, wherein, preferably, the damping strength. Damping serves to allow a freely rotating nacelle to be aligned in a stable manner and, at the same time, to enable it to yield to wind forces, caused by alteration of the angle of attack, for the purpose of rotating the nacelle. Damping is necessary in order to avoid unwanted free rotation of the nacelle. Particularly preferably, the damping is effected by a motor, in particular an electric motor, a hydrodynamic system, in particular a hydrodynamic clutch and/or a brake.

Further, preferably, in the case of alteration of the respective angle of attack, respectively two rotor blades disposed oppositely on the rotor hub are adjusted in an opposite manner and/or in opposite directions, at least substantially, relative to each other, preferably simultaneously. As a result, preferably, moments caused by the alteration of the angle of attack are compensated, at least partially. Moreover, for example when the opposing rotor blades go from one vertical half-space to the other, i.e. upon an upper or lower zero crossing of the rotor blades during rotation of the rotor, it is necessary for the blade position to be adapted accordingly to the respectively other half-space, for each of the rotor blades.

Preferably, an alignment relative to and/or in the wind direction, and/or an angle or angle range between the rotor axis and the wind direction, is taken as a basis for a setpoint position of the nacelle. Particularly preferably, the alignment of the rotor axis is effected, at least substantially, in or parallel to the wind direction. In this case, the rotor attains its optimum output. In particular, correction is effected for the purpose of minimizing the angular deviation between a wind direction and a current nacelle position.

Particularly preferably, a measurement of the current wind direction and/or the current rotation angle of the nacelle, in particular the alignment, relative to the tower and/or to the wind direction, is effected. This measurement is effected, in particular, for the purpose of determining an angular deviation, preferably by means of a control means. On the basis of the measurement, the corresponding angular deviation is then calculated, in order to determine, on the basis of the latter, corresponding parameters for controlling the operating parameters of the wind turbine. In particular, mechanical, electrical and/or radiation-based measuring devices are used to measure the wind direction. Preferably, in particular, wind indicators, preferably having anemometers, radar, LIDAR or similar, are possible. Alternatively or additionally, the relative position of the nacelle in relation to the wind direction, i.e. the angular deviation, may also be determined by determination of the load on the rotor blades. For this purpose, the differing loadings of the rotor blades, in particular in the differing rotary positions of the rotor, are taken as a basis in order to deduce the relative position of the nacelle in relation to the wind.

Further, preferably, a current position, or actual position, of the nacelle, and/or an angular deviation of the nacelle relative to a, or the, setpoint position is determined. Particularly preferably, this determination, or the determination of the angular deviation, is effected substantially continuously. Further, preferably, this is effected for the purpose of, in particular individual, closed-loop control of the setting of the angle of attack. The angle, or angles, of attack is, or are, determined on the basis of the measurement results and/or, in particular, the described outline data, and set accordingly. This preferably ensures optimum control of the operating parameters.

In a preferred embodiment of the invention, the angle of attack of each of the blades is altered, in particular for the purpose of reducing the load on the wind turbine, in particular on the rotor blades. Preferably, for this purpose, the current load on at least one constituent part of the wind turbine, preferably on at least one, in particular each of the rotor blades, is determined. Preferably, the load on the at least one rotor blade is measured, in particular by measurement of the blade deflection, preferably by means of a strain measurement. For this purpose, in particular, at least one strain gauge is used.

Preferably, at least one strain gauge is provided, respectively, for each of the rotor blades. The, in particular individual, closed-loop control of the angles of attack can thus serve to reduce the load on the components of the wind turbine. A continuous and periodic, i.e. cyclic, reaction to current operating parameters, such as blade deformations, in particular resulting from regular and/or irregular loads, for example caused by wind flows, is made possible.

The object on which the invention is based is additionally achieved by a wind turbine having the features of claim 9. This wind turbine is designed, in particular, to execute the method described above. The wind turbine has a rotor that has at least one rotor blade, and preferably two or four rotor blades. The rotor blade is rotatably mounted on a nacelle mounted in a horizontally rotatable manner. Each rotor blade is mounted on the rotor hub so as to be rotatable about the longitudinal axis of the rotor blade, independently of the other rotor blades. At least one means is provided in this case for individually rotating each of the rotor blades about its longitudinal axis, for the purpose of altering the angle of attack. Furthermore, the wind turbine has a measuring means for determining the actual position of the nacelle and/or the deviation of the position of the nacelle relative to a setpoint position. The wind turbine is characterized in that the nacelle can be rotated, as the result of setting and alteration of the angle of attack of at least one rotor blade, for the purpose of minimizing the deviation of the setpoint position and/or achieving a setpoint position. Particularly preferably, the rotor blades can be rotated about their longitudinal axis, for the purpose of altering the angle of attack, so as to achieve thereby a yaw moment and a rotation of the nacelle about its vertical axis. This is to minimize a deviation of the nacelle position from a setpoint position, or to minimize the load on the components of the wind turbine.

Preferably, at least one measuring device is provided for determining the current wind direction and/or determining the current position or rotation of the nacelle, and/or the load on at least one components of the wind turbine. Possible measuring devices are, in particular, those already mentioned above. Particularly preferably, a control system is provided for determining the deviation and/or the dynamic change in the respective angle of attack, preferably by means of at least one control device. Dynamic control of the operating parameters of the wind turbine can be effected on the basis of the measurement values determined by means of the measuring devices. Preferably, control is effected towards the optimum operating parameters already described above.

Additionally preferred are respectively two rotor blades disposed oppositely on the rotor hub, which can be rotated, at least substantially, exactly in the same direction and/or in opposite directions, preferably at least substantially simultaneously, preferably by comparable values. This enables the moments of the rotor blades to be at least partially compensated, when rotated accordingly.

The object on which the invention is based is additionally achieved by a control means for a wind turbine as claimed in any one of the preceding claims. The control means is designed to embody the features for controlling the wind turbine that are described above as obligatory and/or optional. It serves primarily to control the wind turbine in, or into, the optimum operating range, and in particular to maintain the latter.

Figure 2:
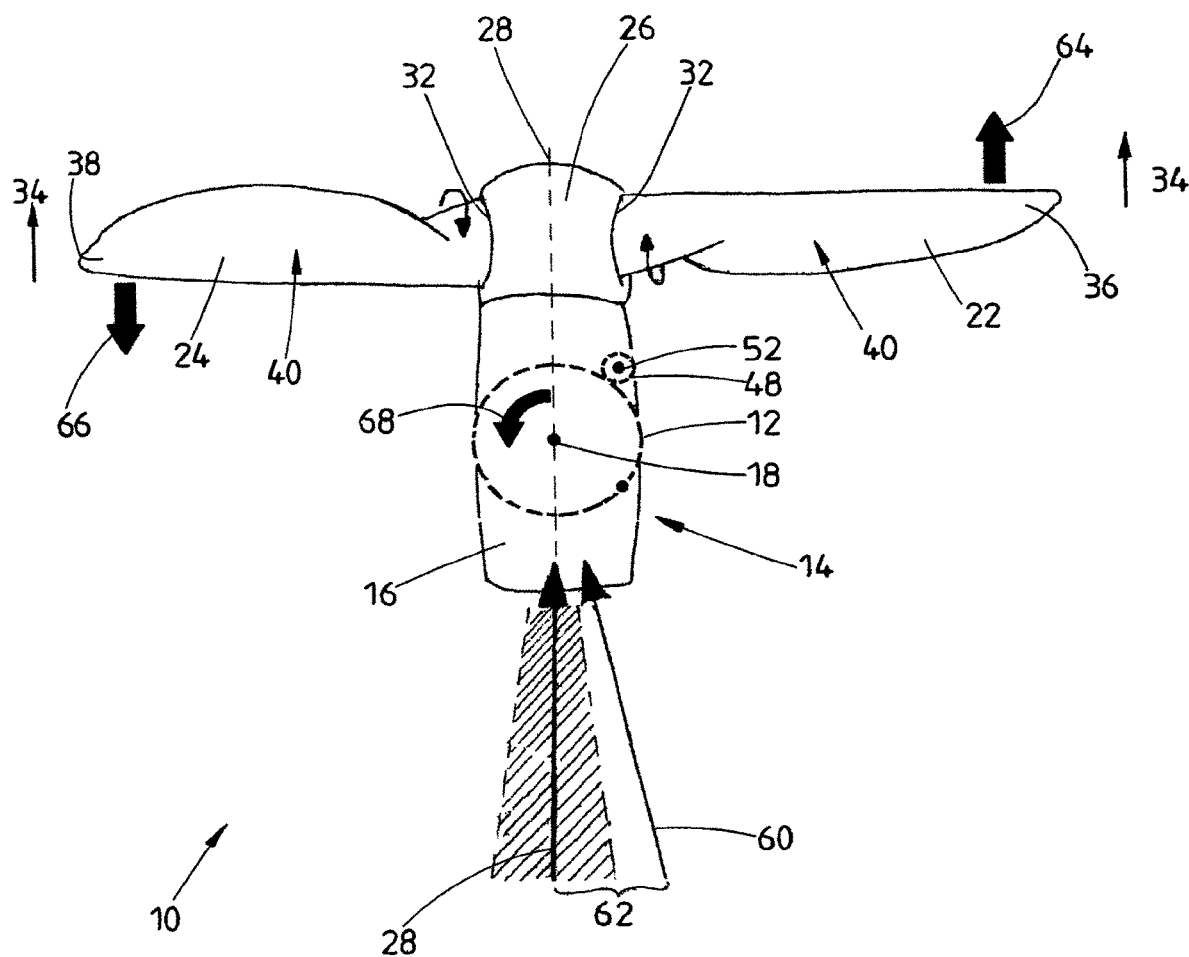
Figure 3:
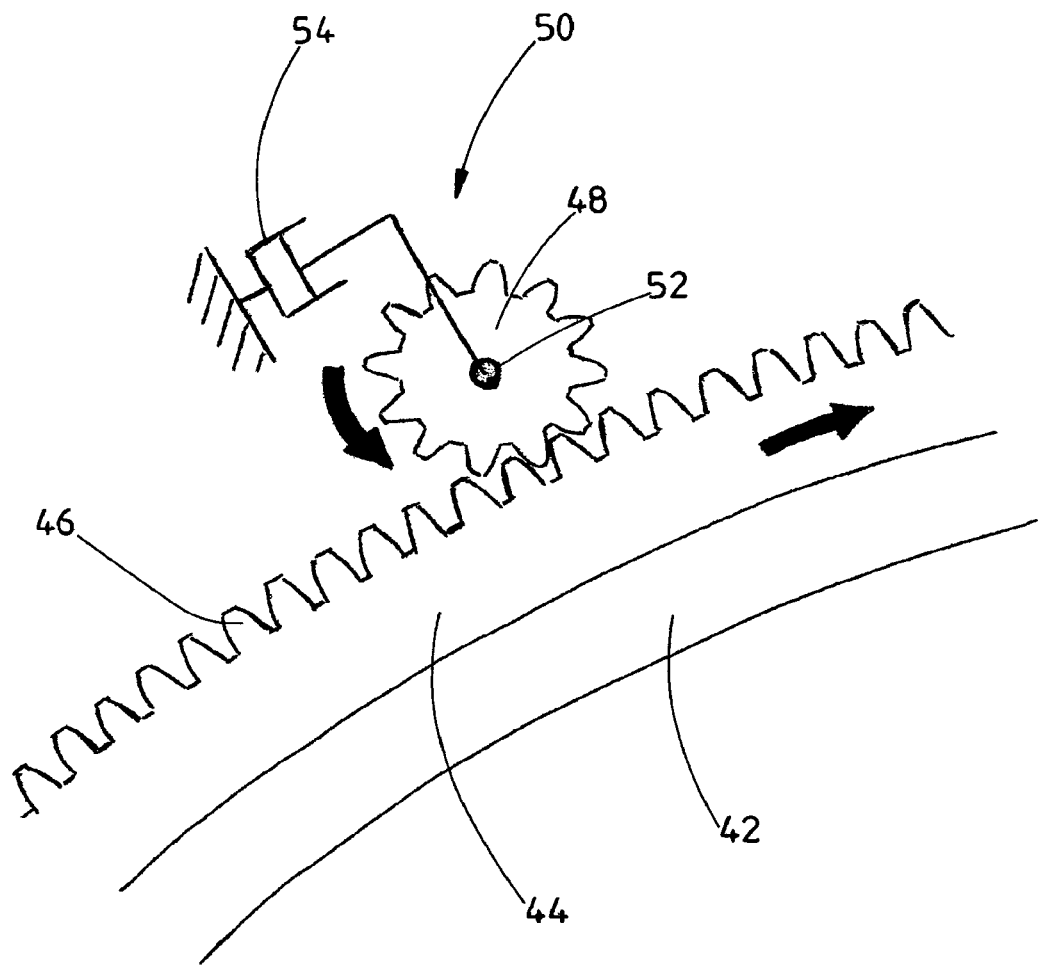
Figure 4:
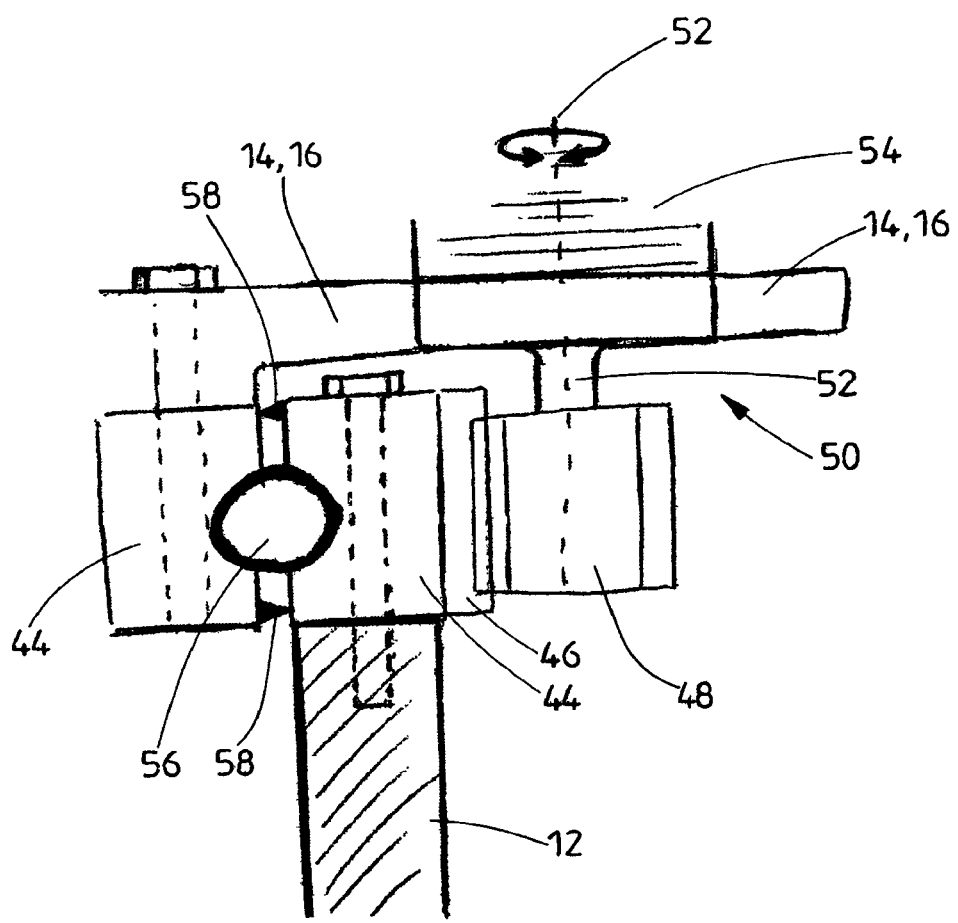

A preferred exemplary embodiment of the invention is described in greater detail on the basis of the figures of the drawing. In the latter:

FIG. 1 shows a representation of a wind turbine according to the invention, in a perspective representation, FIG. 2 shows a view of the wind turbine of FIG. 1, in a top view from above, FIG. 3 shows a portion of the nacelle bearing, with associated mechanism, and FIG. 4 shows a lateral, partial representation of the mechanism relating to the rotation of the nacelle.

A wind turbine 10 comprises a support arrangement such as, in particular, a tower 12, disposed at the upper end of which there is a so-called nacelle 14. The nacelle 14 has a housing 16, inside which there are typically disposed various items of technical equipment such as, in particular, a gearbox, a generator, control means and the like.

An essential element carried by the nacelle 14 is the rotor 20, in this case having two rotor blades 22 and 24, which are attached on one side to a central rotor hub 26. The rotor 20 is designed to rotate in the wind, and thereby to drive a corresponding generator for the purpose of generating electrical energy. For this purpose, the rotor blades 22 and 24 in cross section have the shape of an aerofoil. In FIG. 1, the direction of rotation of the rotor 20 is indicated by corresponding arrows. The rotor 20 in this case rotates about the rotor axis 28, in the plane spanned by these rotor blades 22, 24 and a straight line that is simultaneously perpendicular both to the rotor blades 22 and 24, or to the blade axis 30, and to the rotor axis 28.

In the present case, the wind turbine 10 is a so-called two-bladed turbine. This means that the rotor 20 has just two rotor blades 22 and 24. In this case, for reasons of symmetry, the rotor blades 22 and 24 are each disposed such that they are substantially perpendicular to the rotor axis 28 and on a straight line, the so-called blade axis 30, which itself extends through the centre of the rotor hub 26. The rotor axis in this case extends, substantially in the longitudinal direction, through the housing 16 of the nacelle 14, and usually at least substantially horizontally.

The rotor blades 22 and 24 are disposed so as to be rotatable about the blade axis 30. For this purpose, corresponding blade bearings 32 are disposed in the region of the rotor hub 26. In the figures, the rotation capability is indicated by corresponding ring arrows.

The wind turbine 10 described here is a so-called downwind-rotor turbine. This means that the rotor 20 rotates on the side of the wind turbine 10 that faces away from the are, i.e. the wind first sweeps over the nacelle 14, in order then, as it were, to be incident upon the back side of the rotor 20. This is indicated with the case 34, which denotes the main wind direction. Basically, however, the described invention can also be applied in the case of so-called upwind-rotor turbines, i.e. wind turbines having a rotor that faces toward the wind.

The rotor blades 22 and 24 bend, in the region of their blade ends 36 and 38, according to the respective wind load, in the direction of the main wind direction, as indicated by the arrow 34. Usually, so-called strain gauges 40 are therefore disposed in the region of the surface of the rotor blades 22 and 24 to determine the deflection of the latter. Since the strain gauges 40 extend at least in the region of the blade ends 36 and 38, which are subjected to high loads, but usually substantially along the entire rotor blades 22 and 24, it is thus possible to measure the blade deflection. If necessary, strain gauges 40 may also be disposed on both sides of the rotor blades 22, 24 in order, for example, to enable oscillating motions of the blade to be picked up with greater precision.

For the purpose of rotating the two rotor blades 22 and 24, adjusting means are disposed in the region of the rotor blades 22 and 24, respectively, the rotor hub 26, or the nacelle 14, for the purpose of rotating the rotor blades 22 and 24 about the blade axis 30. This is usually an adjustment effected by motor, in particular a hydraulic and/or electric-motor adjustment. Furthermore, the rotor blades 20 and 24 can be adjusted separately, and independently of each other. For this purpose, both a common adjusting means and separate adjusting means may be provided.

The nacelle 14 is mounted so as to be rotatable, about the nacelle rotation axis 18, relative to the tower 12 of the wind turbine 10. Serving this purpose, on the one hand, is an inner bearing ring 42, which is surrounded by an outer bearing ring 44. The outer bearing ring 44 is connected to the upper end region of the tower 12. The inner bearing ring 42 is mounted on the nacelle 14. The inner bearing ring 42 is movable on the outer bearing ring 44 by means of corresponding bearing means, in particular as ball bearings or roller bearings, i.e. they are mounted, in particular, so as to be rotatable relative to each other. The inner bearing ring 42 in this case has been pressed into the inner circle of the outer bearing ring 44. Inserted between them are bearing means 56 such as, for example, balls or rollers, and, if necessary, spacers 58. Accordingly, the nacelle 14, together with the inner bearing ring 42 the outer bearing ring 44, is mounted so as to be rotatable, with little friction, on the tower 12.

A gear wheel 48 is connected, by means of an axle 52, to a drive unit 54, which is rotatably mounted on the nacelle 14. The drive unit 54 comprises a plurality of constituent parts that are not shown in detail here. On the one hand, the axle 52 is connected to a gearbox. This gearbox is connected to an electric motor, via a hydrodynamic clutch.

In the operating mode, for the purpose of driving the nacelle 14, the electric motor is operated while the hydrodynamic clutch is engaged. The power of the electric motor is thus transmitted to the ring gear 46 via the gearbox and the gear wheel 48. This results in the nacelle being rotated relative to the tower 12.

When operated as a damping element 50, the electric motor is stopped. The gear wheel 48 can thus only be rotated against the resistance of the hydrodynamic clutch. This results in the rotation of the nacelle 14 being damped by the braking force of the hydrodynamic clutch. The gear wheel 48 and the drive unit 54 are therefore also referred to jointly as a damping element 50.

The method according to the invention preferably proceeds as follows:

Since a deviation of the alignment of the rotor 20 from the optimum position in the wind direction causes output losses, this relative position, i.e. the so-called angular deviation, is determined. The rotor axis 28, which extends centrally through the rotor hub 26, and which is simultaneously the rotation axis of the rotor 20, is used as the relevant axis of the rotor 20.

A wind-direction measuring device, for example, may be used to determine the current relative position of the rotor 20, or nacelle 14, in relation to the wind direction. The measuring device may be attached to the nacelle 14, or to a stationary part of the wind turbine 10, or a part thereof that does not rotate concomitantly, such as, in particular, to the tower 12, or also to an external mounting. The measuring device may be, for example, a wind vane, possibly having an anemometer, a radar, a LIDAR (Light Detection And Ranging) or similar. Furthermore, the wind direction may be deduced by measuring the differences in wind load on the rotor blades 22, 24, and the resultant differences in blade deflection. This measurement method may be used separately or in combination with the known methods of measuring the wind direction.

Attachment to the concomitantly rotating nacelle 14 offers the advantage that the wind-direction measuring device already indicates a deviation without additional measurement of the nacelle position. In the case of a stationary measurement of wind direction, for example on the tower 12, it is also additionally necessary to determine the position of the nacelle 14 relative to the tower 12, in order that the deviation between the nacelle position and the wind direction can be calculated. The measured, or calculated, angle between the rotor axis 26 and the wind direction in this case is referred to as deviation. The deviation is preferably determined periodically, at short successive intervals, in order to have the current deviation available at any time, for example in the case of changes in the position of the rotor axis 46 or of the wind direction.

In a further method step, it is established whether the deviation is within predefined limits. This can then be used as a basis for decision concerning the means to be used for correction of the nacelle 14. On the one hand, correction may be effected by motor, but on the other hand correction may also be effected by wind force. If the deviation is below predefined limit values, correction by wind force is usually initiated, otherwise correction at least partially by motor.

Moreover, correction is effected by motor if a plurality of complete rotations of the nacelle 14 about the nacelle rotation axis 18 in only one direction of rotation has in the meantime resulted in the cables, going out from the nacelle, having become twisted inside the tower 12. In order to undo this twist, rotation may then be effected by motor, if necessary, in the opposite direction.

Typically, angular deviations of between 5° and 90°, typically of less than approximately 60°, on both sides are defined as limit values for wind-operated correction. Below this, correction by wind force alone can be achieved without difficulty. Above this, correction may be effected entirely by motor. Alternatively, it is possible to effect a downward adjustment into the range defined for wind-operated correction, i.e. until the deviation is less than the defined maximum angular deviation. At least, however, correction by motor is normally effected above an angular deviation of approximately 90°, since the rotor 20, rotating perpendicularly in relation to the wind direction, can virtually no longer be driven. Consequently, in this position, correction based on wind force usually can no longer function.

Here, correction by motor is effected by means of an electric motor. For this purpose, such an electric motor may already be built-in as part of the damping element 50. The motor is operated, as a drive, in such a manner that, via the gear wheel 48, the nacelle 14 is rotated relative to the ring gear 46 on the outer bearing ring 44, and is thereby rotated relative to the tower 12. This rotation is maintained until the angular deviation of the nacelle 14 relative to the wind direction either becomes less than the defined limit value or even is reduced virtually to zero.

A wind-operated correction is produced by individual adjustment of the angles of attack of the rotor blades 22 and 24, so-called individual pitch control (IPC). For this purpose, the angles of attack of the two rotor blades 22 and 24 are altered, independently of each other, in such a manner that, overall, a resultant yaw moment, i.e. a torque, acts upon the nacelle 14. This is effected by rotation of the rotor blades 22, 24 about their blade axis 30. In order to exert opposing forces, it is necessary for the rotor blades 22, 24 to be rotated in exactly opposite directions, in particular by the same, but opposite, angle of rotation. The resultant yaw moment caused by the wind forces then effects a rotation of the nacelle 14, and thereby effects a correction to reduce the angular deviation. The damping element 50 in this case additionally serves to retard a rotation of the nacelle 14, which can rotate freely relative to the tower 12.

In detail, the individual pitch control (IPC) proceeds as follows:

Firstly, the current position of the nacelle 14 relative to the current wind direction 60, i.e. a possible angular deviation 62, is determined. This may be effected in the ways described above, i.e. for example by measurement of wind direction or by means of blade loads. If it is accordingly found that there is an angular deviation between the current wind direction 60 and the rotor axis 28, the control means initiates a correction by blade pitch control. For this purpose, as described above, the rotor blades 22 and 24 are mounted so as to be rotatable about their own longitudinal axis, i.e. the blade axis 30, for the purpose of adjustment of the so-called blade "pitch".

In this case, the rotor blades 22 and 24 are turned in opposing directions of rotation, in such a manner that the two blades 22 and 24 exert opposing resultant wind forces 64 and 66, respectively, via the rotor axis 28, upon the nacelle 14. A torque, or a so-called yaw moment 68, is thereby exerted upon the nacelle 14. The nacelle 14 thus rotates in the direction of the exerted yaw moment 68, such that the current angular deviation 62 is reduced as a result of this correction.

The control system performs the measurement and correction almost continuously, or at a high repetition rate, i.e., in particular, several times to many times per second. The control system can thus react at any time to changes in wind conditions.

LIST OF REFERENCES 10 wind turbine
12 tower
14 nacelle
16 housing
18 nacelle rotation axis
20 rotor
22 rotor blade
24 rotor blade
26 rotor hub
28 rotor axis
30 blade axis
32 blade bearing
34 arrow
36 blade end
38 blade end
40 strain gauge
42 inner bearing ring
44 outer bearing ring
46 ring gear
48 gear wheel
50 damping element
52 axle
54 drive unit
56 bearing means
58 spacer
60 wind direction
62 angular deviation
64 wind force
66 wind force
68 yaw moment

The invention claimed is:

1. A method for operating a wind turbine (10), the wind turbine being a downwind-rotor turbine, having a rotor (20), which is mounted on a rotatably mounted nacelle (14) and which has at least one rotor blade (22), the method comprising the steps of: exposing the at least one rotor blade of the wind turbine (10), during operation, to the wind on the side of the nacelle facing away from the wind, determining an angular deviation (62) of the nacelle position from a setpoint position, adjusting the angle of attack of each of the at least one rotor blade (22) at least one of individually and continuously, such that the nacelle (14) is made to rotate to correct a rotor axis (28) into a setpoint position by means of a yaw moment (68) effected by wind forces, and dampening the rotation of the nacelle (14), at least temporarily, by at least one damping element (50); and rotating the nacelle (14) by a motor when a predetermined angular deviation (62) of the position of the nacelle (14) from the setpoint position is exceeded, at least until the angular deviation becomes less than a predetermined angular deviation.

2. The method as claimed in claim 1, wherein the damping element (50) has a settable damping effect, and further comprising the step of setting at least one of a damping strength and direction, in a stepless manner.

3. The method as claimed in claim 1, further comprising the step of determining the setpoint position of nacelle (14) from an alignment relative to at least one of a wind direction (60) and an angle or angle range between the rotor axis (28) and the wind direction (60).

4. The method as claimed in claim 1, wherein the at least one rotor blade (22) includes at least two rotor blades (22, 24), and the method further comprises the steps of individually adjusting the angle of attack of each of at least two rotor blades (22, 24) for reducing a load at at least one of the wind turbine (10), the constituent parts thereof, and on the at least one rotor blade (22, 24), measuring a blade deflection of each blade (22, 24) and determining a current load on at least one of a constituent part of the wind turbine (10), each of the at least two rotor blades (22, 24) as a function of the measurement.

5. The method as claimed in claim 1, further comprising the step of rotating the nacelle (14) until the setpoint position has been substantially attained.

6. A method for operating a wind turbine (10), the wind turbine being a downwind-rotor turbine, having a rotor (20), which is mounted on a rotatably mounted nacelle (14) and which has at least one rotor blade (22), the method comprising the steps of: exposing the at least one rotor blade of the wind turbine (10), during operation, to the wind on the side of the nacelle facing away from the wind, determining an angular deviation (62) of the nacelle position from a setpoint position, adjusting the angle of attack of each of the at least one rotor blades (22) at least one of individually and continuously, such that the nacelle (14) is made to rotate to correct the rotor axis (28) into a setpoint position by means of a yaw moment (68) effected by wind forces, and dampening the rotation of the nacelle (14), at least temporarily, by at least one damping element (50) wherein the at least one rotor blade (22) include at least two rotor blades (22,24), and further comprising the steps of rotating the at least two rotor blades (22,24) to adjust a respective angle of each of the at least two rotor blades (22, 24) oppositely disposed on the rotor hub (26) in at least one of an opposite manner and in opposite directions, relative to each other, by rotation of the at least two rotor blades (22, 24), to compensate moments caused thereby.

7. A method for operating a wind turbine (10), the wind turbine being a downwind-rotor turbine, having a rotor (20), which is mounted on a rotatably mounted nacelle (14) and which has at least one rotor blade (22), the method comprising the steps of: exposing the at least one rotor blade of the wind turbine (10), during operation, to the wind on the side of the nacelle facing away from the wind, determining an angular deviation (62) of the nacelle position from a setpoint position, adjusting the angle of attack of each of the at least one rotor blades (22) at least one of individually and continuously, such that the nacelle (14) is made to rotate to correct the rotor axis (28) into a setpoint position by means of a yaw moment (68) effected by wind forces, and dampening the rotation of the nacelle (14), at least temporarily, by at least one damping element (50), wherein the at least one rotor blade (22) includes at least two rotor blades (22, 24), and individually adjusting the angle-of attack of each of at least two rotor blades (22, 24) for reducing a load at least one of the wind turbine (10), the constituent parts thereof, and on the at least two rotor blades (22, 24), measuring a blade deflection of each of the at least two blades (22, 24) and determining a current load on at least one of a constituent part of the wind turbine (10), each of the at least two rotor blades (22, 24) as a function of the measurement; and wherein two respective blades of the at least two rotor blades (22, 24) disposed oppositely on the rotor hub are rotatable in at least one of substantially the same direction and in opposite directions relative to each other.

\* \* \* \* \*